Figure 1:
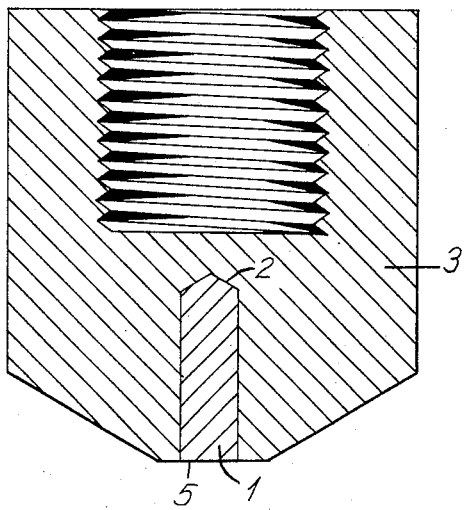

INVENTOR.
MILTON C. OTTO

United States Patent Office 3,368,951
Patented Feb. 13, 1968

3,368,951
METAL PLATING PROCESS AND ARTICLE
MADE THEREBY
Milton C. Otto, Indianapolis, Ind., assignor to Union
Carbide Corporation, a corporation of New York
Filed Feb. 17, 1964, Ser. No. 345,510
9 Claims. (Cl. 204—32)

This invention relates to a metal plating process and bath and more particularly to a process for nickel plating zirconium and thorium substrates.

The invention also relates to a non-consumable electrode made by a process wherein the novel nickel plating process is utilized.

Many kinds of electrodes are employed in the various arc processes practiced to perform metallurgical, chemical and physical processes. For example, in electric furnaces and arc lamps, carbon electrodes have long been used. Carbon electrodes have been considered to be non-consumable even though they are used up rather rapidly. In the welding art, tungsten and thoriated tungsten have been used as non-consumable electrodes. Also, in the welding art, electrode wires are used to provide filler metal to the welds being made. These wire electrodes are consumable electrodes.

In the various arts, and especially the metallurgical art, there has long been the problem of obtaining a non-consumable electrode which has a long operating life; which would not contaminate the metal being treated; and which could withstand operation in gaseous atmospheres which normally would attack and cause erosion of the electrode. Tungsten is an extremely good electrode material for non-consumable electrodes when the arc is operated in an inert atmosphere such as, for example, argon or helium. However, tungsten cannot be operated as an electrode for any length of time in atmospheres of oxygen or of an oxidizing nature.

Recently, an electrode was developed wherein metals such as thorium and zirconium were metallurgically bonded to a metal holder characterized by its high thermal conductivity. Typical metal holders were made from copper, silver, aluminum, brass and steel. Usually, the thorium or zirconium or equivalent materials were embedded in a cavity in the metal holder and then metallurgically bonded thereto. Thus, these type of electrodes are commonly referred to as "insert electrodes." Insert electrodes have proved to have increased life over prior art electrodes and are especially useful in atmospheres containing oxygen and nitrogen.

One of the most critical features of these electrodes is that there must be a good metallurgical bond between the insert material and the metal holder to obtain optimum heat transfer from the insert to a fluid-cooled holder.

An exemplary embodiment of this type of electrode is more fully described in U.S. Patent 3,198,932 issued August 3, 1965, in the name of Merle H. Weatherly.

My invention is predicated on the discovery of an improved nickel plating bath whereby nickel can be plated onto a zirconium or thorium substrate with good adherence when such plated substrate is subjected to the thermal shock of brazing such as encountered when brazing the zirconium or thorium insert to a metal holder when making "insert electrodes."

With the above considerations in mind, an object of the invention is to provide a novel nickel plating process and bath.

A primary object is to provide an improved process for plating nickel to zirconium and thorium.

Yet another object is to provide an improved process for reliably bonding zirconium and thorium to metals such as copper, silver, aluminum, brass and stainless steel.

A further object is to provide a process for reliably metallurgically bonding a zirconium or thorium insert to an insert holder.

Still another object is to provide an electrode having long operating life when compared with prior art electrodes.

Another object is to provide an electrode having long operating life when operated in atmospheres which are deleterious to prior art electrodes.

A still further object is to provide a process for plating nickel on zirconium or thorium wherein the nickel plating may withstand thermal shock.

Figure 2:
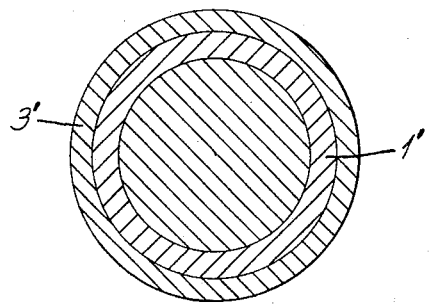

These and other objects will be pointed out or become apparent from the following description and drawings wherein:

FIGURE 1 is a vertical section of an illustrative electrode embodying the present invention; and FIGURE 2 is a transverse cross-section of an alternative form of an electrode according to the present invention.

While the invention will be described with reference to the preferred embodiment of bonding inserts of zirconium and thorium to metal holders of copper, silver, aluminum, brass and steel, the invention in its broadest aspects, is not so limited but includes within its scope the method of plating nickel on the metals zirconium and thorium.

The objects are accomplished by plating nickel onto a zirconium or thorium substrate from a nickel plating bath which is an aqueous solution consisting essentially of from about 20 to about 50 grams per liter nickel sulfate; from about 6 to about 12 grams per liter zirconium sulfate; from about 10 to about 30 grams per liter sodium hypophosphate; from about 10 to about 30 grams per liter sodium acetate; from about 10 to about 30 grams per liter sodium citrate.

In plating the metal zirconium or thorium the metal is first cleaned. Then the metal is immersed in the metal plating bath which is maintained between from 85 to about 100° C. While the metal is immersed in the bath, a D.C. voltage of from about 1 to about 50 volts is applied between an anode and the metal zirconium or thorium acting as a cathode. The voltage is applied for about 1 to about 50 seconds to initiate the reaction.

In making insert electrodes of the invention after the nickel coating is formed on the insert metal, such insert is brazed to the metal holder which may be copper, silver, aluminum, brass or steel.

Referring to the drawings, an insert metal 1 having a nickel coating 2 is fitted into a metal holder 3 provided with a cavity. The insert metal has a size and shape conforming to the shape of the cavity in the metal holder so that such insert metal 1 will have an arcing surface 5. The insert metal is provided with a nickel coating on all surfaces adapted to fit into the cavity. A brazed bond is made between the nickel coated surfaces of the insert metal and the metal holder.

FIGURE 2 illustrates an alternative form of the electrode having a circular insert 1' in a metal holder 3'.

As an illustrative example of the invention, zirconium of thorium is first thoroughly cleaned. For a zirconium insert, the cleaning bath comprises, for example, 1 part of a degreaser to 2 parts water. For thorium, the cleaning bath comprises 1 part sulfuric acid to 2 parts water. These compounds will clean the respective metals without harmfully attacking them. The temperature of the cleaning bath is maintained between 30 to 100° C. Below 30 degrees, the cleaning becomes very inefficient, above 100° C. foaming occurs. The length of time that the inserts are kept in the bath is dependent upon the bath temperature. Optimum results are achieved at a temperature of 80° C. with an immersion time of 10 minutes. After cleaning, the inserts should be handled only with metal holders. Second, the insert is rinsed in hot water after cleaning. Third, the insert is immersed in a nickel plating bath, the principal ingredients of which are nickel sulfate, zirconium sulfate and sodium hypophosphite. Nickel sulfate is used in order to provide the necessary nickel cations. Sodium hypophosphite reduces the cations to metallic nickel. Zirconium sulfate promotes better bonding and adherence of the nickel deposit to the zirconium or thorium substrate. Without zirconium ions present, the coating exhibits poor adherence when subjected to thermal shock such as when brazing the coated metal to a metal holder on the insert electrode. Zirconium ions improve coating adherence such that brazing is possible.

The preferred nickel plating bath is an aqueous solution which consists essentially of 40 grams per liter nickel sulfate; 10 grams per liter zirconium sulfate; 21 grams per liter sodium hypophosphate; 20 grams per liter sodium acetate; 20 grams per liter sodium citrate.

The temperature of the metal bath is kept between 85 to 100° C. At less than 85° C., the nickel will not plate out. Above 100° C., decomposition occurs.

After immersing the zirconium or thorium inserts in the bath, a 1 to 50 volt D.C. potential, with the insert acting as the cathode, is briefly (1–5 seconds) applied. A steel rod can be used as the anode. A voltage of at least 1 volt is needed to initiate the reaction. On the other hand, a voltage of over 50 volts will yield a flaky coating.

The coating will be formed after about 30 minutes. The insert is then rinsed in water, dried and then conventionally brazed in the hole of the electrode holder.

Using the techniques described and the novel plating bath, the bond between the zirconium or thorium inserts and the electrode holder is more reliably achieved. That is, metallurgical bonds are repeatedly obtained between the zorconium or thorium inserts and the holders which have optimum heat transfer capability.

For purposes of this disclosure the phrase "grams per liter" means grams per liter of solvent.

What is claimed is:

1. Nickel plating bath for plating nickel on metals taken from the class consisting of zirconium and thorium which is an aqueous solution consisting essentially of from about 20 to about 50 grams per liter nickel sulfate; from about 6 to about 12 grams per liter zirconium sulfate; from about 10 to about 30 grams per liter sodium hypophosphate; from about 10 to about 30 grams per liter sodium acetate; from about 10 to about 30 grams per liter sodium citrate.

2. Nickel plating bath for plating nickel on metals taken from the class consisting of zirconium and thorium consisting essentially of 40 grams per liter nickel sulfate; 10 grams per liter zirconium sulfate; 21 grams per liter sodium hypophosphate; 20 grams per liter sodium acetate; 20 grams per liter sodium citrate.

3. A method for plating nickel on metals taken from the class consisting of thorium and zirconium comprising cleaning said metal; immersing the clean metal into a nickel plating bath which is an aqueous solution consisting essentially of from about 20 to about 50 grams per liter nickel sulfate; from about 6 to about 12 grams per liter zirconium sulfate; from about 10 to about 30 grams per liter sodium hypophosphate; from about 10 to about 30 grams per liter sodium acetate; from about 10 to about 30 grams per liter sodium citrate, maintaining the temperature of said bath between about 85° and 100° C.; applying a D.C. voltage of from about 1 to 50 volts for about 1 to 5 seconds between the immersed metal acting as a cathode and an anode to initiate the chemical reaction whereby nickel is coated on the metal cathode.

4. A method for plating nickel on metals taken from the class consisting of thorium and zirconium comprising cleaning said metal; immersing the clean metal into a nickel plating bath which is an aqueous solution consisting essentially of 40 grams per liter nickel sulfate; 10 grams per liter zirconium sulfate; 21 grams per liter sodium hypophosphate, 20 grams per liter sodium acetate; 20 grams per liter sodium citrate; maintaining the temperature of said bath between about 85° and 100° C.; applying a D.C. voltage of from about 1 to 50 volts for about 1 to 5 seconds between the immersed metal acting as a cathode and an anode to initiate the chemical reaction whereby nickel is coated on the metal cathode.

5. A method for making an electrode which comprises cleaning an insert material taken from the class consisting of zorconium and thorium; immersing the clean insert into a metal plating bath which is an aqueous solution consisting of from about 20 to about 50 grams per liter nickel sulfate; from about 6 to about 12 grams per liter zirconium sulfate; from about 10 to about 30 grams per liter sodium hypophosphate; from about 10 to about 30 grams per liter sodium acetate; from about 10 to about 30 grams per liter sodium citrate; maintaining the temperature of said bath between about 85 and 100° C.; applying a D.C. voltage of from about 1 to 50 volts between the immersed insert acting as a cathode and an anode for about 1 to 5 seconds to initiate chemical reaction whereby the insert is coated with a nickel coating; and then brazing the nickel coated surfaces of said insert to a metal insert holder having a high thermal conductivity.

6. A method according to claim 5 wherein said insert material is zirconium and said zirconium is cleaned in a bath consisting of 1 part of a degreaser to 2 parts water and maintained in said cleaned bath at a temperature between 30° and 100° C.

7. Method according to claim 5 wherein said insert material is thorium and said thorium is cleaned in a bath consisting of 1 part sulfuric acid to 2 parts water and said bath is maintained between 30° and 100° C.

8. A method for making an electrode which comprises cleaning an insert material taken from the class consisting of zirconium and thorium; immersing the clean insert into a metal plating bath which is an aqueous solution consisting of 40 grams per liter nickel sulfate; 10 grams per liter zirconium sulfate; 21 grams per liter sodium hypophosphate; 20 grams per liter sodium acetate; 20 grams per liter sodium citrate; maintaining the temperature of said bath between about 85° and 100° C.; applying a D.C. voltage of from about 1 to 50 volts between the immersed insert acting as a cathode and an anode for about 1 to 5 seconds to initiate chemical reaction whereby the insert is coated with a nickel coating and then brazing the nickel coated surfaces of said insert to a metal insert holder having a high thermal conductivity.

9. A method for making an electrode which comprises cleaning an insert material taken from the class consisting of zirconium and thorium; immersing the clean insert into a metal plating bath which is an aqueous solution consisting essentially of from about 20 to about 50 grams per liter nickel sulfate; from about 6 to about 12 grams per liter zirconium sulfate; from about 10 to about 30 grams per liter sodium hypophosphate; from about 10 to about 30 grams per liter sodium acetate; from about 10 to about 30 grams per liter sodium citrate; maintaining the temperature of said bath between about 85° and 100° C.; applying a D.C. voltage of from about 1 to 50 volts between the immersed insert acting as a cathode and an anode for about 1 to 5 seconds to initiate chemical reaction whereby the insert is coated with a nickel coating and then brazing the nickel coated surfaces of said insert to a metal selected from the class consisting of copper, silver, aluminum, brass and steel.

References Cited

UNITED STATES PATENTS

| | | | |
|---|---|---|---|
| 2,827,399 | 3/1958 | Eisenberg | 117—130 |
| 2,921,888 | 1/1960 | Halpert | 204—32 |
| 2,938,841 | 5/1960 | Dale | 204—32 |
| 3,243,361 | 3/1966 | Clark | 204—38 |
| 3,264,199 | 10/1966 | Fassell | 204—38 |

FOREIGN PATENTS 658,668  2/1963  Canada.

OTHER REFERENCES

Faust et al. Article "Plating," September 1956, pages 1134–1142 relied on.

HOWARD S. WILLIAMS, *Primary Examiner.*

JOHN H. MACK, *Examiner.*

W. VAN SISE, *Assistant Examiner.*